United States Patent [19]
Vindez

[11] 4,083,646
[45] Apr. 11, 1978

[54] POSITIVE FEED DRILL WITH RAPID ADVANCE

[75] Inventor: Pierre G. Vindez, Redondo Beach, Calif.

[73] Assignee: Zephyr Manufacturing Co., Inc., Inglewood, Calif.

[21] Appl. No.: 749,017

[22] Filed: Dec. 9, 1976

[51] Int. Cl.² .................................... B23B 47/18
[52] U.S. Cl. ................................ 408/133; 408/14
[58] Field of Search .............. 408/111, 129, 132, 133, 408/14, 16, 12

[56] References Cited

U.S. PATENT DOCUMENTS

| | | | |
|---|---|---|---|
| 3,124,817 | 3/1964 | Mosier | 408/133 |
| 3,512,434 | 5/1970 | Juhasz et al. | 408/132 X |
| 3,767,313 | 10/1973 | Bohoroquez et al. | 408/14 |

*Primary Examiner*—Gil Weidenfeld
*Attorney, Agent, or Firm*—Whann & McManigal

[57] ABSTRACT

A portable positive feed drilling device in which there is a spindle carrying a cutting tool with means for rotating the spindle and the cutting tool in order to perform a cutting operation on the work, and in which there is a normal speed spindle feed means and a rapid advance spindle feed means, either of which may be caused to feed said spindle toward said work.

12 Claims, 9 Drawing Figures

POSITIVE FEED DRILL WITH RAPID ADVANCE

DESCRIPTION OF THE ART

Positive feed drilling devices of the type for automatically controlling the advance and retraction of the drill spindle are known in the art and such devices are shown in U.S. Pat. No. 3,487,729 and No. 3,767,313, as well as the patents which were cited against these two patents during their prosecution in the Patent Office.

Very often a drill is used for drilling through separate layers of metal or other material. In the prior art devices drilling operations are slowed up because the cutting drill advances at all times at the cutting rate of the tool. Considerable time could be saved if the spindle in such a drill could be moved at a relatively fast speed when the cutting end of the cutter is moving from one of the metal layers to the other.

SUMMARY OF THE INVENTION

It is an object of my invention to provide a positive feed drill adapted to drill through a multiple of separate layers of metal or other material and in which there is a fast advance feed whereby the drill and spindle can be moved rapidly when the cutting end of the cutting tool has cut through one layer and is moving to the next layer.

It is a further object of my invention to provide a means which can be operated by the operator of the drill whereby by pushing a button the speed of advance of the spindle can be increased two-fold or more.

It is an object of my invention to provide a positive feed drill having a normal spindle feed means for feeding the spindle toward the work and a rapid advance spped means for operating said feed means at a rapid speed when the cutting tool is moving between separated layers of work in combination with means whereby the operator may selectively cause said spindle feed means to be driven at its normal speed or its rapid advance speed.

It is a further object of my invention to provide a positive feed drill of the character described which includes a signal means whereby when the feed means is operating at a rapid advance feed, a signal is given when the cutting tool comes into engagement with the work.

Other objects of the invention relate to the unique details of construction and unique combinations employed by me, which details and further objects will be made evident during the course of the detailed description of my invention.

DESCRIPTION OF THE PREFERRED EMBODIMENTS

Figure 1:
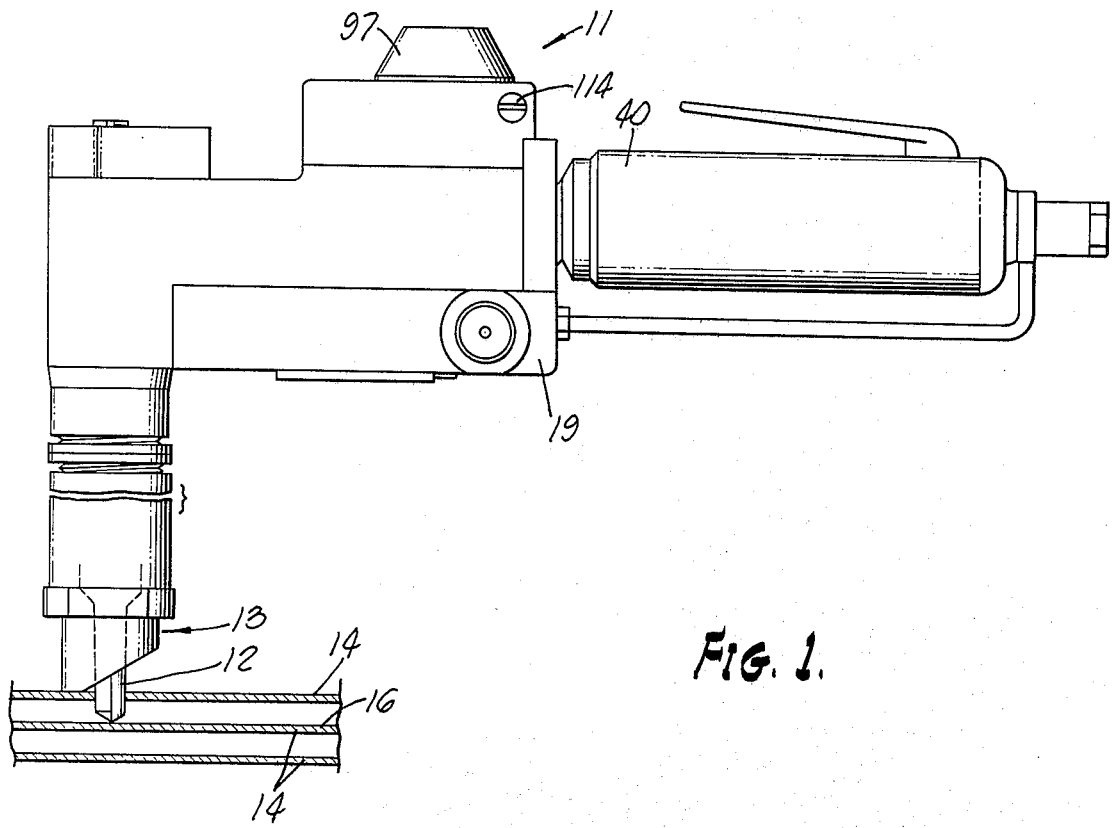
FIG. 1 is an elevational view of the invention showing its utility.
Figure 8:
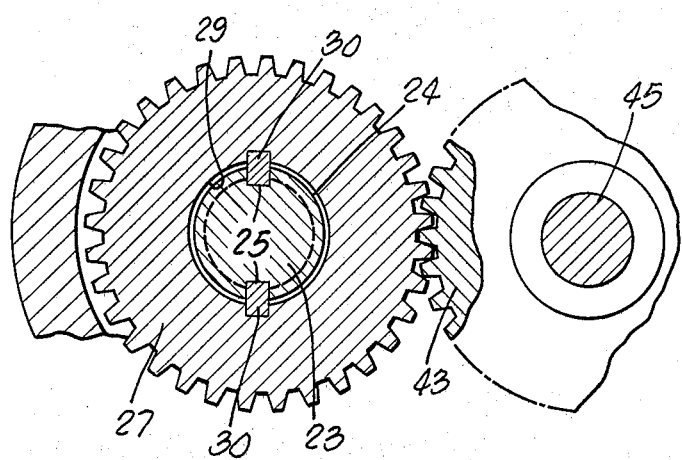
FIG. 8 is a cross-sectional view taken along the line 8—8 of FIG. 2, showing the manner in which the drive gear is drivably connected to the spindle.

As shown in FIG. 1, the feed drill 11 is positioned with the surface sensing means 13 in contact with the upper working layer 14 and with the drill 12 having drilled through the first layer 14 and the cutting end thereof in contact with the intermediate work layer 14.

My invention may be used in conjunction with the invention of the patent to Bohorquez and Vindez U.S. Pat. No. 3,767,313, issued Oct. 23, 1973 and assigned to Zephyr Manufacturing Co., Inc., of Inglewood, California, and therefore, the details of construction disclosed and described in said patent are hereby made a part of this disclosure by reference thereto.

Also, my invention may be used in conjunction with the invention described and disclosed in the patent to Juhasz, Bohorquez and Vindez U.S. Pat. No. 3,487,729, issued Jan. 6, 1970, and assigned to said Zephyr Manufacturing Co., Inc. The disclosure and description of this patent is also made a part of this disclosure by reference thereto.

In my invention the rapid advance drive means may be employed at any time it is desired to move the cutting tool from one layer of metal to another. Also, it is sometimes desirable where the metal being cut or drilled is thick, to retract the drill to clear out the cuttings. My invention also may be used at that time in order to rapidly advance the drill to the bottom of the hole.

Figure 2:
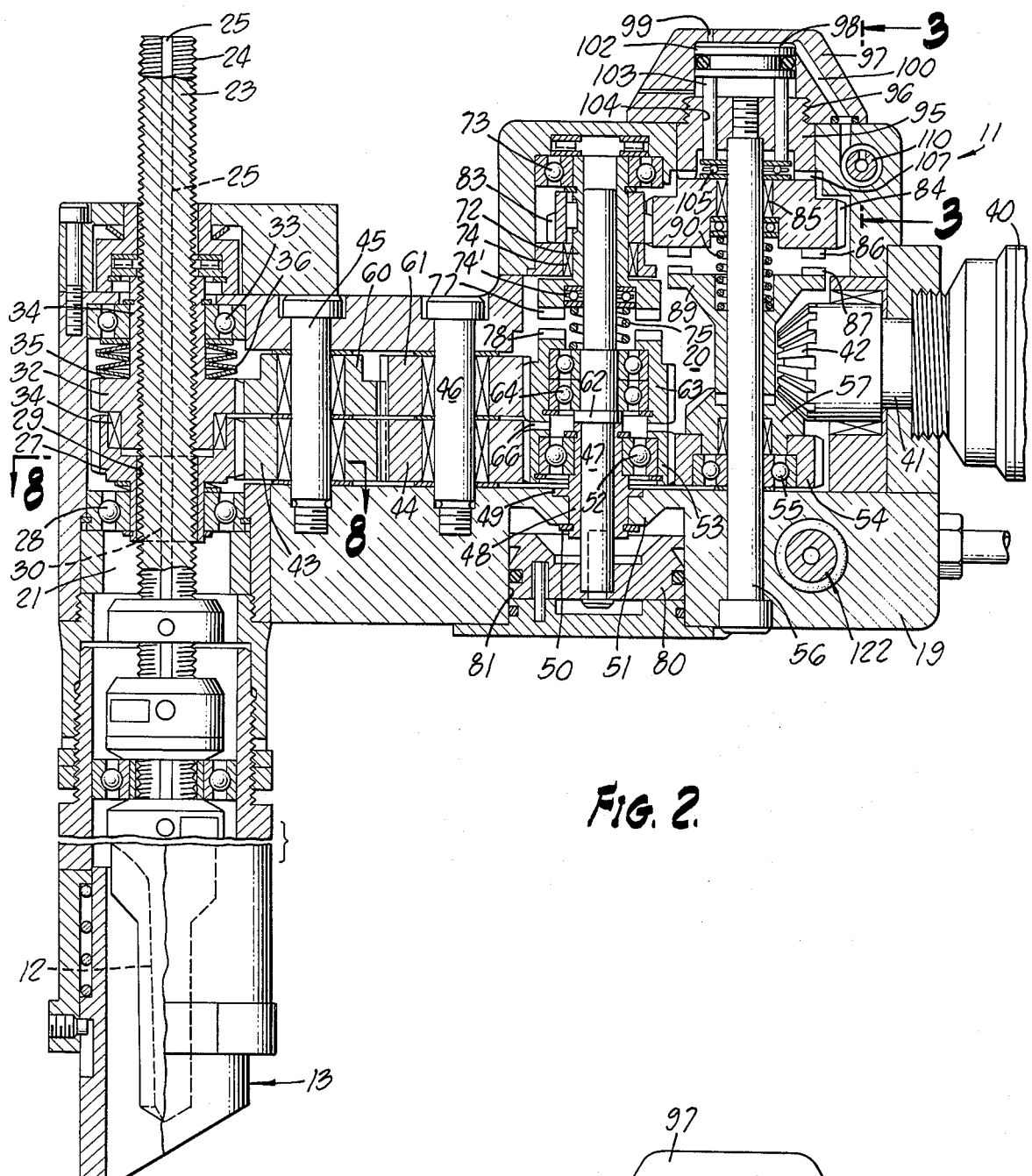
FIG. 2 is a vertical sectional view showing the position of the parts when the drill is being rotated at a normal drilling speed and in which the spindle on which the drill is mounted is being fed downwardly at a normal cutting rate.
Figure 3:
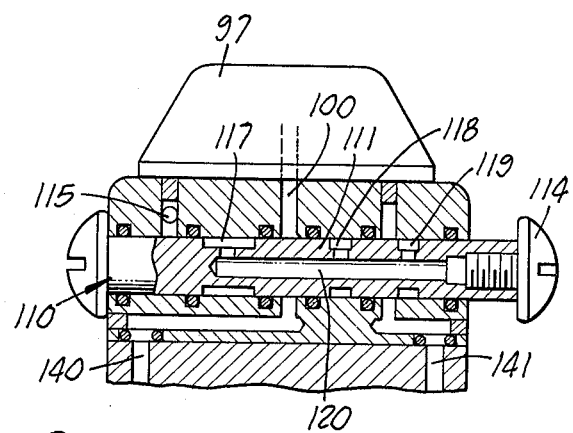
FIG. 3 is a cross-sectional view taken along the line 3—3 showing a shuttle valve arrangement whereby certain parts are operated in order to cause the spindle to be fed downwardly at a rapid advance rate.

As shown in FIG. 2, the positive feed drill 11 has a body 19 which provides a substantially horizontally disposed gear chamber 20 and a spindle chamber 21 which extends at right angles thereto. Extending vertically through the chamber 21 is a spindle 23 externally threaded at 24 and having two longitudinal grooves or keyways 25. The lower end of this spindle projects downwardly from the body and has the drill or other cutting means 12 secured thereto.

Mounted in the body is a spindle rotating gear 27 supported by a bearing 28 so as to be rotatable but not movable in an axial direction. This gear 27 constitutes the spindle rotating means of the invention. This gear 27 has a cylindrical opening 29 through which the spindle 23 is extended and the gear is provided with two integral keys 30 which extend into the keyway 25 so that when the gear 27 is rotated the spindle will be rotated. However, the spindle is free to move in a vertical or axial direction at all time.

Above the spindle drive gear 27 is a spindle feed gear 32 which is supported at its upper end by a bearing 33 and at its lower end by a needle bearing 34 positioned in a cylindrical counterbore of the spindle drive gear 27. This spindle feed gear constitutes the spindle feed means of the invention. When the gear 32 is rotated in a spindle advancing direction at a faster rpm than the drive gear 27, the spindle will be moved downwardly or be moved in a direction toward the work 14. Means is provided for rotating the feed gear at this normal feed rate and also at an advanced rate of rotation whereby the spindle 23 will be moved toward the work or through the work in a rapid advance speed.

The spindle feed gear 32 also may be stopped, causing the rapid retraction of the spindle 23 in an upward direction in order to remove the drill 12 from the work.

The spindle feed gear 32 has an upwardly extending shank 34 and compressed between the surface 35 of the gear and the bearing 33, which is mounted in the body 19, is a spring such as a "Belleville" spring 36, which holds the spindle feed gear 32 in its downward position.

At the side of the body 19 opposite from the spindle chamber 21 there is supported a motor housing 40 which supports a motor which may be operated by air or other source of power. This motor has a shaft 41 extending through the body and mounted on the shaft is a beveled gear 42 which is positioned in the gear chamber 20.

For connecting the gears 27 and 32 to the beveled gear 42 of the motor applicant provides the following structure:

Idler gears 43 and 44 are rotatably supported on stationary shafts 45 and 46, the two gears 43 and 44 being drivably associated with each other and the gear 43 being adapted to drive the spindle drive gear 27. In alignment with the two shafts 45 and 46 is a shaft 47 and rotatably positioned on this shaft 47 is a sleeve 48. The sleeve 48 is held from moving vertically by means of the shoulder 49 and the lock ring 50, which engage the adjacent portion 51 of the body 19. Rotatably mounted on this sleeve 48 by a bearing 52 is a gear 53 which meshes with and drives the gear 44. The shaft 47 is vertically movable but this operation is performed in connection with the means for connecting the rapid advance drive for driving the spindle feed gear at a rapid speed, and, therefore, will be described later.

Gear 54 rotatable on bearing 55 mounted on shaft 56 engages the gear 53. Gear 54 has connected to it gear 57 which engages beveled gear 42. Thus, it will be seen that when the motor is driven the chain of gears 42, 57, 54, 53, 44 and 43 will drive the spindle rotating gear 27. These gears are so sized that the spindle will be rotated at the proper rpm to perform the drilling operation or the cutting of the metal.

The rate of rotation of the gear 47 is always the same unless the rpm of the motor shaft 41 is increased or decreased.

The spindle feed gear is driven at its "normal" rate of speed by a gear arrangement which will now be described, and here again when the spindle gear is driven through the normal drive it will always be driven at such a speed with relationship to the gear 27 that the drill will be fed into the metal to be cut at the proper speed.

In other words, when the spindle feed gear is driven at its normal speed it will always be driven at a speed properly related to the rate of rotation of the drive gear 27.

Positioned on the shafts 45 and 46 are idler gears 60 and 61 which mesh with each other, gear 60 meshing with spindle feed gear 32. It will be noted that gear 60 is one-half the height of the other gears. This is arranged so that it clears the Belleville spring 36.

Mounted on the shaft 47 and positioned directly above the shaft collar 62 is a feed drive gear or connecting gear 63 which meshes with the gear 61, there being bearing means 64 rotatably supporting the gear 63 on the shaft 47.

As shown in FIG. 2, the gear 63 which is axially movable into two positions is in such a position that its lower clutch 66, consisting of clutch parts 67 on the gear 63 and clutch parts 68 on the gear 53, are in engagement. Whenever the parts are in this position, as shown in FIG. 2, the idler gears 60 and 61 and the spindle feed gear 32 is driven from the gear 53. Thus, it will be seen that the gear 53 at this time drives or rotates both the drive gear 27 and the feed gear 32, and in this way the relative rates of rotation of these two gears are always the same.

When the parts are in the position shown in FIG. 2 the drill and the spindle will be rotated at the proper cutting or drilling speed and also the spindle and drill will be fed downward and into the work at the proper feed rate so that the optimum rotation and feed for proper cutting is automatically maintained.

When the parts are in the position shown in FIG. 2 the drill is being rotated and fed at the proper speed to cut the metal.

When the drill is used to cut through layers of metal separated by distances as shown in FIG. 1 it is obvious that time will be lost if the spindle continues to move at its normal rate. Therefore, in applicant's invention by a simple operation of moving a shuttle valve the spindle and drill may be moved at the advanced speed to bring the drill into engagement with a first or second layer of metal to be cut and at this time the shuttle valve will be returned to its original position and the drill 12 and the spindle 23 will be again driven at their normal cutting rate.

Applicant will now describe the structure for operating the feed gear 32 at its advanced speed, and will describe the means whereby this rapid advance means is brought into and out of operating position.

Positioned above the feed drive gear 63 and rotatable on the shaft 47 is a clutch element or sleeve 72 which is rotatably supported at its upper end by bearings 73 and at its lower end by bearing 74. Below thrust bearing 74′ is spring 75 which normally holds gear 63 in its downward position, as shown in FIG. 2.

The clutch sleeve or clutch element 72 is rotatable on the shaft 47, but is not axially movable.

Figure 4:
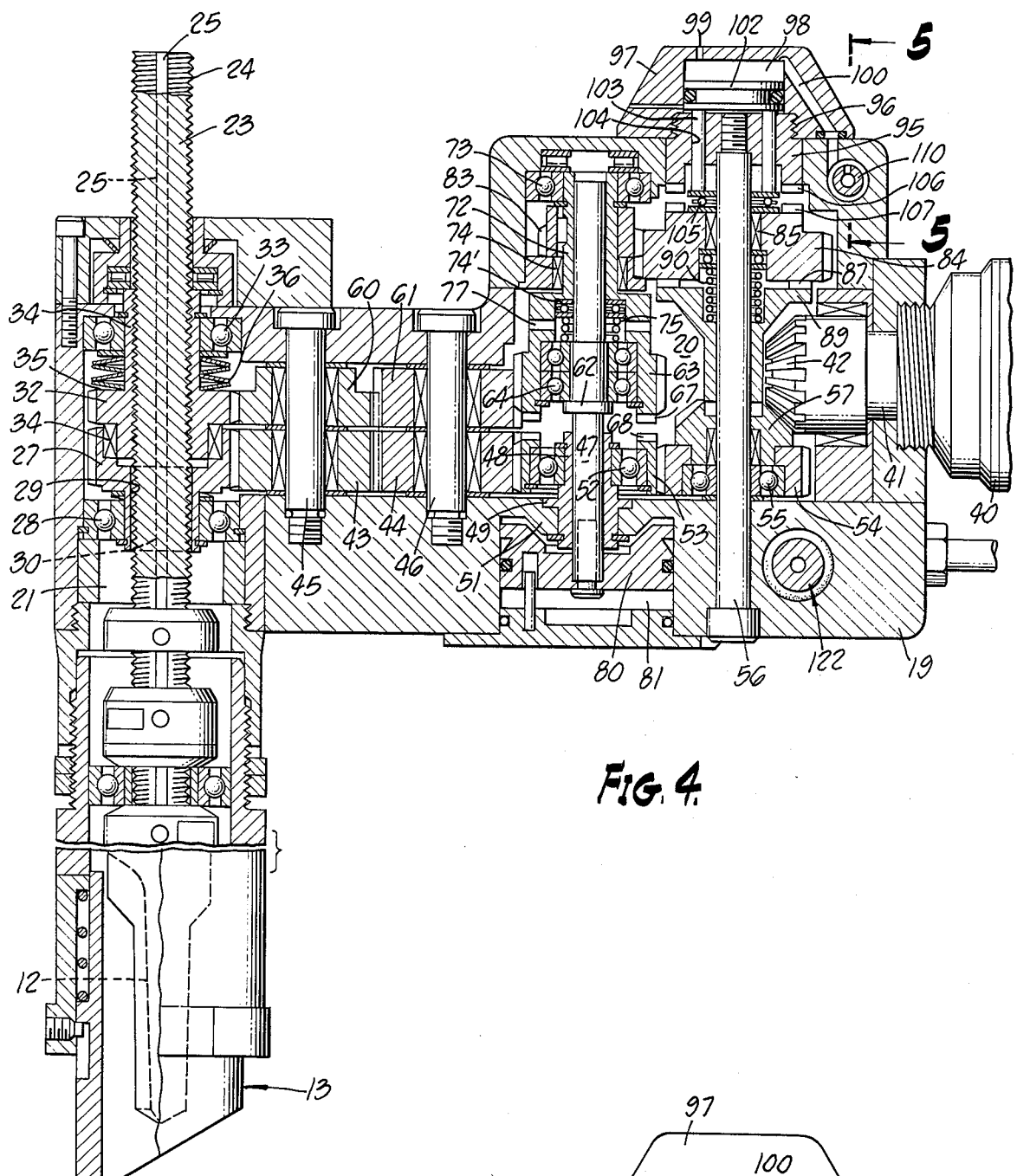
FIG. 4 is a cross-sectional view similar to FIG. 2 but showing the parts in the position they occupy when the spindle is being moved downwardly in rapid advance.

The clutch sleeve 72 at its lower end includes clutch part 77 which, when the gear 63 is in a raised position, engages the clutch part 78 on the upper part of the gear 63 and at this time the gear 63 is in the position shown in FIG. 4, in which position it is disengaged from the gear 53 and is engaged with the clutch sleeve 72, and will be driven by the clutch sleeve 72. The shaft 47 at its lower end is connected to a piston 80 positioned in a cylinder 81. The shaft 47 is moved upward against the action of the spring 75 by introducing air into the cylinder 81, which moves the piston 80 upwardly from the position shown in FIG. 2 into the position shown in FIG. 4. The means for operating the piston 80 will be described shortly.

The clutch sleeve 72 carries a gear 83 which meshes with gear 84, which is rotatable on the upper end of the shaft 56, there being a suitable bearing 85.

On the lower wall of the gear 84 is a clutch part 86 which can mesh with clutch part 87 provided at the upper end of a clutch sleeve 89. The clutch sleeve 89 is associated with the bevel gear 57 and will be rotated on the shaft 56 whenever the bevel gear 57 is rotated.

Figure 9:
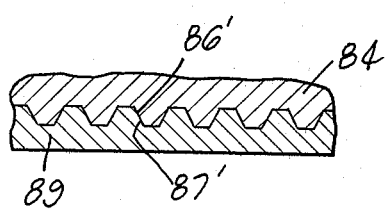
FIG. 9 is a fragmentary sectional view showing the release clutch or ratchet clutch employed in the rapid advance feed means of my invention.

As shown in FIG. 9, the clutch whereby gear 84 may be driven, is a release type of clutch whereby the amount of force which can be transmitted through the clutch may be controlled. As will be seen from FIG. 9, the side walls 86' and 87' are at angles to the axis of the parts and as the torque increases the parts will be separated and disengaged. At that time there will be a ratchet action which makes an audible signal. Thus it will be seen that when the cutter is moved into the position shown in FIG. 1 the torque transmitted through the various parts is increased, the clutch will release making an audible signal and allowing the spindle and its cutter to stop rotation. At that time the operator, as explained later, will then operate the controls to move the parts so that the spindle will be positively driven at its normal advance speed.

The parts 84 and 89 are normally held in separated positions by the spring 90, which is compressed between these parts and normally holds the gear 84 in its raised position, as shown in FIG. 2, in which position the gear 84 is not driven by the clutch sleeve 89.

Means is provided for moving the gear 84 downwardly against the action of the spring 90. Positioned in the body above the upper end of the shaft 56 is a shaft support 95 and secured to the upper threaded end 96 thereof is a cap 97 which forms a piston chamber or chamber 98 having a bleed opening 99 and a fluid supply passage 100 connected to its upper end.

Positioned in the chamber 98 is a piston 102, and extending downwardly from the piston 102 are rods 103 which extend through openings 104 in the support 95. The lower ends of the rods 103 engage a thrust bearing 105 which, in turn, engages an upper part of the gear 84. Between the gear 84 and the support 95 are clutch elements 106 and 107 which engage when the gear 84 is in a raised position in order to hold the gear 84 non-rotatable. The clutch element 107 may be considered a lock means which, when engaged by the clutch element 106, locks the gear 84 from rotation and thus locks the advance feed drive means from operation. The clutch, of course, is disengaged when the parts are in the position shown in FIG. 4.

When fluid or air under pressure is supplied to the chamber or cylinder 98 through the passage 100, the piston 102 is moved downwardly and the gear 84 is moved from the position shown in FIG. 2 into the position shown in FIG. 4. At this time the gears 84 and 85 and the clutch sleeve 72 are in a position to be rotated.

As will be shortly described, when air is supplied to the cylinder 98 it is also supplied to the cylinder 81 so that the gear 63 is disengaged from the gear 53 and is engaged with the sleeve 72. Therefore, the parts will be in the position shown in FIG. 4 and at this time the gear 63 will be driven at its rapid advance speed and the spindle feed gear 32 will be driven twice as fast as the drive gear 27 because gear 84 is twice the diameter of gear 83 in order that the spindle 23 will be rapidly advanced in a downward direction.

Figure 6:
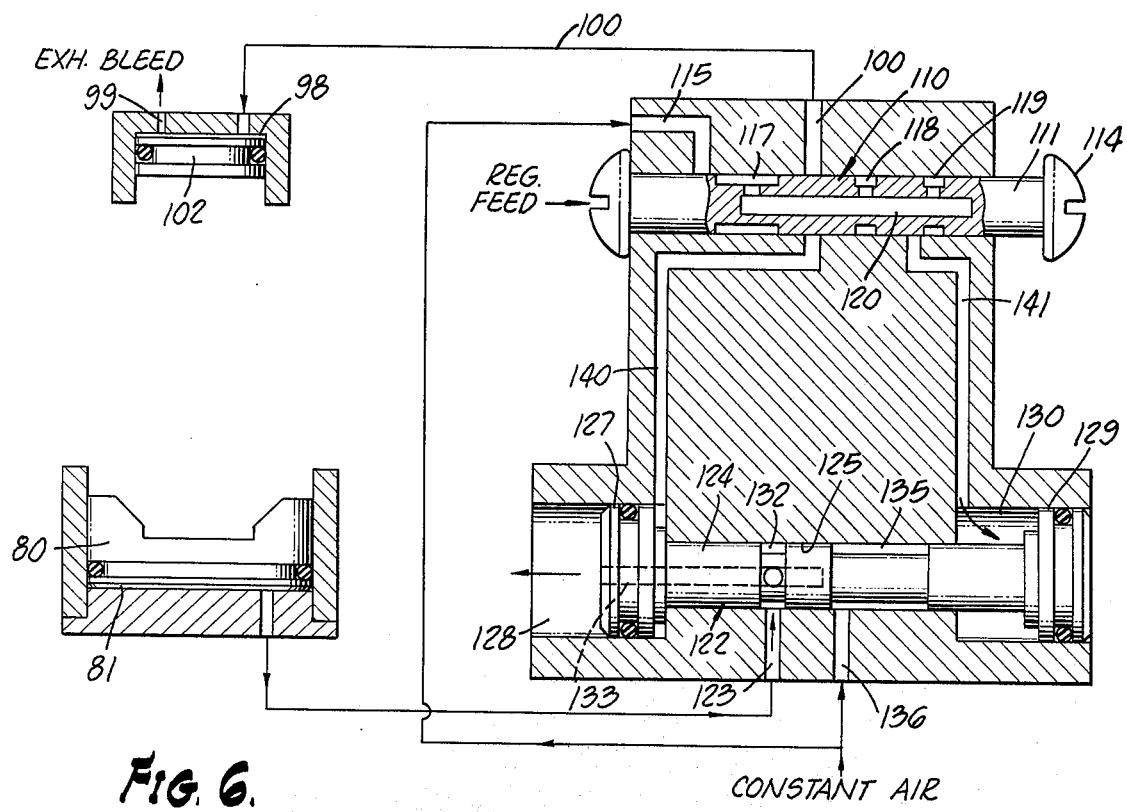
FIG. 6 is a schematic view showing the position of the various air or fluid operated parts when the drill is in normal feed position, as shown in FIG. 1.
Figure 7:
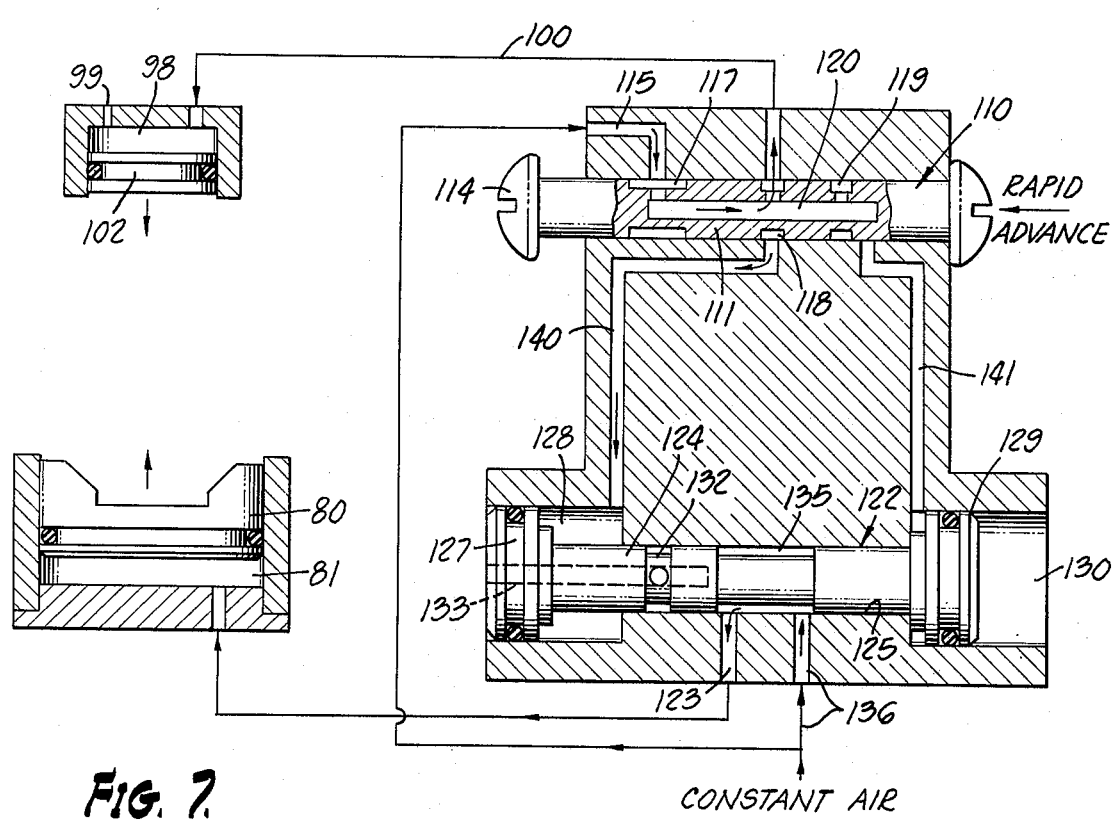
FIG. 7 is similar to FIG. 6, but showing the fluid operated parts in the position they occupy when the drill is in rapid advance position, as shown in FIG. 4.

The means for operating the pistons 80 and 102 is a simple means and will be diagrammatically illustrated in FIGS. 6 and 7.

Figure 5:
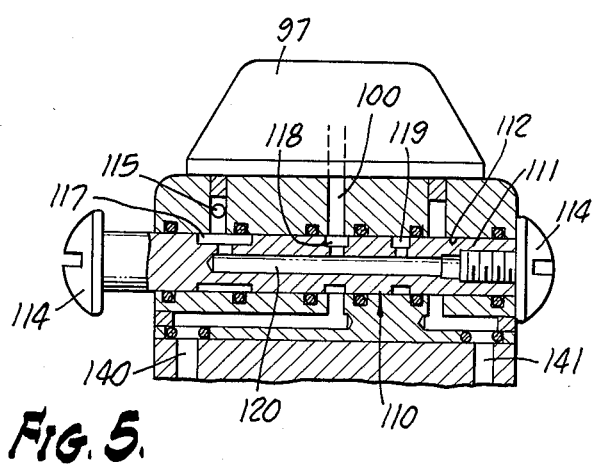
FIG. 5 is a cross-sectional view similar to FIG. 3 showing the position of the shuttle valve when the spindle is being rapidly advanced in a downward direction.

There is a hand-operated shuttle valve 110 positioned as shown in FIGS. 1, 2 and 4, and which is constructed as shown in the enlarged sectional view, FIG. 5. The shuttle valve has a cylindrical valve element 111 which is axially movable in the cylindrical opening 112. Each end of the slide valve has enlarged heads 114 which are readily engaged to move the shuttle valve from the position shown in FIG. 6 into the position shown in FIG. 7, and vice versa.

Air under pressure comes into the body through a passage 115, which passage connects to the cylinder 112. The slide valve or shuttle valve 111 has air channels 117, 118 and 119, each of which are joined together by a central air passage 120.

When the shuttle valve is in the position shown in FIG. 6 the air supply passage 115 is closed. The air passage 100, which leads to the cylinder 98 is closed, and, therefore, in view of the bleed opening 99, there is no air pressure in the cylinder and the gear 84, is, therefore, held in its raised position, as shown in FIG. 2.

Below the shuttle valve is a pressure controlled valve 122, which controls the flow of the air through air passage 123, which is connected to the cylinder 81. The valve 122 has a slide valve element 124, which is slidable in a cylindrical passage or cylinder 125. At the left-end of the valve 124 is a piston 127 movable in a chamber 128, and at the opposite end there is a piston 129 movable in the cylinder 130. The valve 124 has an outlet air chamber 135, which receives air under pressure through the passage 136 in the body 19. When the shuttle valve is in the position shown in FIG. 6 the spindle feed gear 32 is being driven at its normal feed speed, such as is desirable when the bit 12 is drilling through metal.

When the drill 12, for example, has drilled through the layer of metal 14 and enters the space 15, in order to save time the shuttle valve is moved from the position shown in FIG. 6 into the position shown in FIG. 7, and this is done by pressing on the head or enlargement 114 of the right-end of the shuttle valve. With the parts in the position shown in FIG. 6 there is, of course, no air being supplied to either of the cylinders 81 and 98. Upon movement of the shuttle valve into the position shown in FIG. 7 the air chamber 117 is connected to the air pressure inlet 115, and at this time air is supplied from the chamber 118 to the passage 100, which moves the pistons 102 into the position shown in FIG. 4. Also, air is supplied through the passage 140 to the cylinder 128 and the pressure actuated valve is moved to the left into the position shown in FIG. 7. At this time, the air passage 123 to cylinder 81 is disconnected from the exhaust passage 133 and is connected to the air supply chamber 135, thus supplying air under pressure, through the passage 123 to the cylinder 81, which moves the shaft 47 upwardly and causes the gear 63 to be driven by the clutch sleeve 72.

When this action occurs the spindle feed gear 32 is now being driven through the rapid advance chain of gears and connections, the parts being in the position shown in FIG. 4.

When the bit has been advanced downwardly so that it now contacts the layer of metal 16 the clutch parts 86 and 87 will release permitting the spindle and cutter to stop rotating and also giving the audible signal. The operator then moves the shuttle valve from the position shown in FIG. 7 into the position shown in FIG. 6, and when this is done the feed gear will then again be driven at its normal speed.

When the shuttle moves from the position shown in FIG. 7 the air supply chamber 119 passes over the air supply passage 141, which is connected to the cylinder 130, and this will move the piston 129 rightwardly and will disconnect the passage 132 from the air pressure chamber 135 and connect it to the exhaust passage 133.

At this time, the air under pressure in the cylinder 98 will bleed through the bleed opening 99 and spring 90 will raise the gear 84 to disengage the clutch elements 86 and 87 and to engage the clutch elements 106 and 107, thus holding the gear 84 from rotating. At the same time air under pressure will flow out of the cylinder 81, which permits the spring 75 to expand and to push the shaft 47 and gear 63 downward so that these parts and associated parts will again occupy the positions shown in FIG. 2. At this time the rapid advance means is non-operating, the clutch parts 77 and 78 are disengaged, and the clutch parts 66 and 67 are engaged so that the spindle feed gear is then again driven from the gear 53.

I claim:

1. A positive feed drill, the combination including:
   (a) a spindle adapted to carry a cutting tool;
   (b) spindle rotating means for rotating said spindle for causing cutting action when said spindle is moved toward the work;
   (c) spindle feed means for feeding said spindle;
   (d) spindle feed drive means for operating said spindle feed means at a normal rate;
   (e) rapid advance drive means for operating said spindle feed means for feeding said spindle toward said work at a rapid advance speed;
   (f) manually operable means for connecting said spindle feed drive means to said advance speed drive means; and
   (g) means for locking said rapid advance drive means from operation.

2. A combination as defined in claim 1 in which there is a signal means incorporated in said rapid advance speed means which operates when said cutting tool engages said work, when said spindle is being driven by said rapid advance speed means, and manually operable means for disconnecting said rapid advance speed means from said spindle feed means.

3. A combination as defined in claim 2 in which said signal means comprises a clutch in said rapid advance speed means which releases when said cutting tool engages said work.

4. A combination as defined in claim 1 in which there is a movable gear which can be moved at will between one position in which said spindle feed drive means is connected to said spindle feed means and another position in which said rapid advance speed means is connected to said spindle feed means.

5. A combination as defined in claim 4 in which said last-mentioned means comprises a gear engageable with said spindle feed means, having clutch means on opposite sides thereof for engagement with said spindle drive means or said rapid advance speed drive means, drive motor, means for connecting said drive motor to said rapid advance speed drive means when said gear clutch is engaged to be driven by said rapid advance speed drive means, and means for locking said rapid advance speed drive means when it is disconnected from said drive motor.

6. A combination as defined in claim 7 in which there is a manually operable means for disconnecting said rapid advance speed drive means from said spindle feed means.

7. A positive feed drill, the combination of:
   (a) a threaded spindle adapted to carry a cutting tool;
   (b) spindle rotating means having a spindle rotating gear through which said spindle extends for rotating said spindle in a single direction;
   (c) spindle feed means having a spindle feed gear through which said spindle extends and which is threadedly engageable with said spindle for moving said spindle longitudinally;
   (d) a motor to which said spindle rotating means is connected for rotating said spindle in a single direction;
   (e) advance speed drive means for operating said spindle feed means whereby said spindle feed gear may be driven at an advanced speed;
   (f) connecting means operable independent of longitudinal movement of said spindle feed means for connecting said spindle feed means to be driven either by said spindle rotating means or said advance speed drive means; and
   (g) means for locking said advance speed gear means from operation.

8. A combination as defined in claim 7 including means for connecting said advance speed drive means to a motor for driving same, and in which there is a locking means operable to lock said advance speed drive means from operation when said advance speed drive means is disconnected from its driving motor.

9. A combination as defined in claim 7 in which said connecting means is in the form of a gearing having two positions in which said gear in one position engages a clutch which is driven by the motor and in the other position engages a locking means whereby said gear and its associated parts of said advance speed drive means are restrained from operating.

10. A combination as defined in claim 7 in which said spindle rotating means has a gear with a clutch on one side thereof, and in which said advance speed drive means has an output clutch and in which said connecting means has an axially movable gear in engagement with said spindle feed means, said axially movable gear having two positions, one position in which it is engageable with the clutch on said gear of said spindle rotating means, and a second position in which it is engageable with the clutch on said advance speed drive means.

11. A positive feed drill, the combination of:
   (a) a threaded spindle adapted to carry a cutting tool;
   (b) a spindle rotating gear through which said spindle extends, for rotating said spindle in a single direction;
   (c) a spindle feed means including a spindle feed gear through which said spindle extends and which is threadedly engageable with said spindle for moving said spindle longitudinally;
   (d) gear means connecting said spindle rotating gear to a motor for rotating said spindle in a single direction;
   (e) advance speed drive means for rotating said spindle feed gear whereby said spindle feed gear may be driven at an advanced speed;
   (f) a connecting gear connected to drive said spindle feed means, said connecting drive gear having two positions, one position in which it is adapted to be driven by said advance speed drive means and the other position in which it is adapted to be driven by said gear means connecting said spindle rotating gear to a motor; and
   (g) manually operable means for moving said connecting gear into either of said positions.

12. A combination as defined in claim 11 in which there is an advance speed drive means driving gear movable between two positions, one of which position connects said advance speed drive means to said motor and the other position connecting said gear to a lock means whereby the locking of said gear locks said advance feed drive means from operation.

* * * * *